(12) United States Patent
Woodburn

(10) Patent No.: US 12,177,766 B2
(45) Date of Patent: Dec. 24, 2024

(54) IDENTIFICATION OF EMERGENCY VEHICLES VIA WIFI BEACON ANALYSIS WITH FALSE ALARM SUPPRESSION

(71) Applicant: Shaun Woodburn, Alpharetta, GA (US)

(72) Inventor: Shaun Woodburn, Alpharetta, GA (US)

(*) Notice: Subject to any disclaimer, the term of this patent is extended or adjusted under 35 U.S.C. 154(b) by 379 days.

(21) Appl. No.: 17/454,859

(22) Filed: Nov. 15, 2021

(65) Prior Publication Data

US 2022/0167255 A1 May 26, 2022

Related U.S. Application Data

(60) Provisional application No. 63/116,359, filed on Nov. 20, 2020.

(51) Int. Cl.
| | |
|---|---|
| *H04W 48/16* | (2009.01) |
| *H04W 4/90* | (2018.01) |
| *H04W 12/122* | (2021.01) |
| *H04W 12/65* | (2021.01) |
| *H04W 12/71* | (2021.01) |

(52) U.S. Cl.
CPC .............. *H04W 48/16* (2013.01); *H04W 4/90* (2018.02); *H04W 12/122* (2021.01); *H04W 12/65* (2021.01); *H04W 12/71* (2021.01)

(58) Field of Classification Search
CPC ....... H04W 48/16; H04W 4/90; H04W 12/71; H04W 12/122; H04W 12/65; H04W 76/15; G06F 16/29
See application file for complete search history.

(56) References Cited

U.S. PATENT DOCUMENTS

| | | | |
|---|---|---|---|
| 2013/0091452 A1* | 4/2013 | Sorden ................... | G06F 30/20 715/771 |
| 2020/0092685 A1* | 3/2020 | Fehrenbach ........ | H04W 84/047 |
| 2021/0356279 A1* | 11/2021 | Szigeti ............... | G01C 21/3407 |

* cited by examiner

*Primary Examiner* — Iqbal Zaidi
(74) *Attorney, Agent, or Firm* — Scott C Harris, Esq

(57) ABSTRACT

An emergency vehicle detector with false detection processing. Wifi MAC address patterns and SSID pattern identification is used to identify and estimate range of emergency vehicles that contains a Wifi Access Point and exclude other Wifi Beacons by comparing to a location specific database. False alarms are detected and silenced.

16 Claims, 3 Drawing Sheets

… … …

IDENTIFICATION OF EMERGENCY VEHICLES VIA WIFI BEACON ANALYSIS WITH FALSE ALARM SUPPRESSION

This application claims priority from Provisional 63/116,359, filed Nov. 20, 2020, the entire contents of which are herewith incorporated by reference.

BACKGROUND

When driving on a public street, it is important to be able to detect, and make way for, emergency vehicles, such as ambulances, police and other first responders. Emergency vehicles conventionally make a loud noise to warn motorists of their location.

Emergency vehicles can alternatively, however, be located by tracking or otherwise following their communication radios when the vehicle transmits a message. However, the vehicle operators only transmit infrequently and there are numerous repeaters on the same frequency. Many police scanners have a proximity detector that performs this function.

SUMMARY OF THE INVENTION

The inventor recognized that there are a number of drawbacks with the current ways of detecting emergency vehicles.

The present application describes techniques to track a wireless signal, referred to herein as "wifi", created by an emergency vehicle to display alerts when emergency vehicle wifi signals are detected. The wifi signals can be any kind of wireless signal.

In embodiments, the system also stores information about what a proper alert should look like. Based on these stored parts, the system determines whether a specific alert is likely to be an improper alert. An embodiment blocks alerts from being caused by matches to that improper alert.

Embodiments also enable the user to manually add alert blocks, where different kinds of alert blocks can operate in different ways as described herein. The alert blocks can sort by location using GPS, by SSID and MAC IDs, and by combinations of these different parameters.

Summarizing the modes discussed above, the Wifi lockout modes include:
1. MAC Lockout—only Locks out that specific device by MAC
2. SSID Lockout—Locks out all SSID's for that Manufacturer that contain a certain string of characters.
3. MANU+GPS Lockouts—Locks out that Manufacturer in that area with selectable Radius/City/County
4. Auto GPS Lockout of false Police/Emergency Vehicle Wifi Beacon Alerts The device stores and displays the location of each alert and the number of times this alerts has come from the same location. Once the alert is seen three times in the same location it will automatically lock it out.

The system can indicate direction of the Police/Emergency Vehicle with an Arrow up/Down Left/Right to indicate Arrow up—forward, Arrow down—behind, Left Arrow indicates left and Right indicates right.

False signals can be locked out manually by storing the false signal's GPS coordinates of the false signals when no police car is present.

Also, the system can learn and store the locations of the false signals automatically by storing signals from the last times at the same GPS location and comparing the pattern of signals at the same frequency was that were measured. Specifically, a 10×10 GPS signal map is stored and compared by signal subtraction and calculation of the Root Mean Square difference less that a variable threshold.

BRIEF DESCRIPTION OF THE DRAWINGS

In the Drawings:
the figures show aspects of the invention, and specifically

DETAILED DESCRIPTION

The present application describes a system for detecting an emergency vehicle such as an ambulance, police vehicle, EMS, fire vehicle or other kind of first responder or emergency vehicle.

An embodiment describes a system for detecting the Wi-Fi signal of an emergency vehicle and creates an alert for the motorist, while blocking alerts that are likely to be false alerts.

The system can be used to assist motorists to comply with Move Over laws by alerting the motorists to the presence of emergency vehicles, in an improved way. This system can detect the emergency vehicles sooner than a user attempting to see the emergency vehicles.

In an embodiment, this system can also be used to help Motorists to avoid "instant on" Radar Speed traps and Laser Radar Speed Traps.

This also helps motorists avoid traffic delays due to accidents by detecting a large number of emergency vehicles detected in their area, e.g., up to 1 mile.

Figure 1:
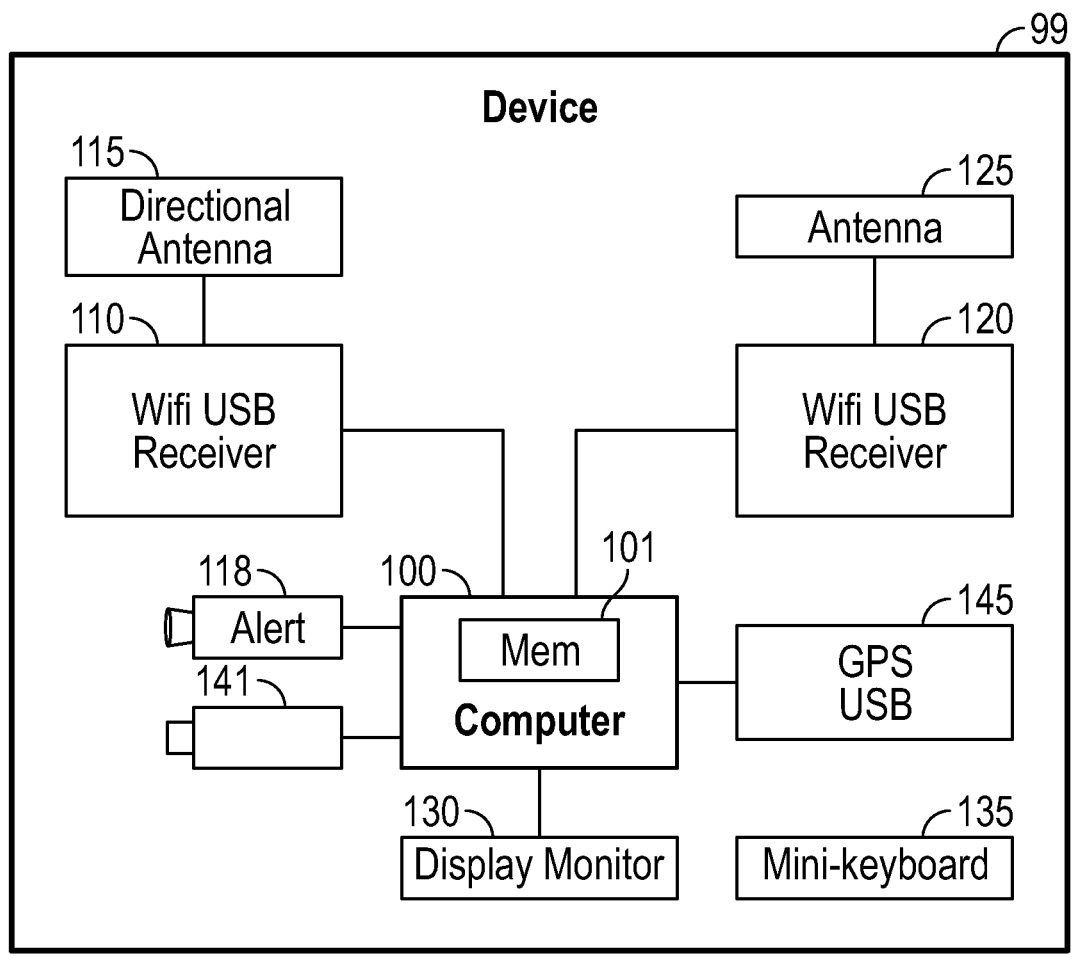
FIG. 1 shows a block diagram of the hardware of the system.

FIG. 1 shows a block diagram, which is formed of a computer 100 connected to peripherals and configured to carry out the functions as described herein. The computer 100 is connected to a Wi-Fi USB receiver 110 which itself is connected to an antenna 115. There can be multiple channels of USB receivers attached, including an additional Wi-Fi receiver 120 connected to an additional antenna 125. In one embodiment, the Wi-Fi antenna 115 is a high gain directional and the other antenna 125 can be a omni directional antenna, such as a whip antenna. In another embodiment, the Wi-Fi antenna 115 preferentially receives Wi-Fi signals from a first direction, e.g. the front of the vehicle, and the Wi-Fi antenna 125 preferentially receives the Wi-Fi signals from a second direction e.g. the back of the vehicle. By preferentially receiving the signals from one side or from the other, this enables determination of a likely direction from which the emergency vehicle is transmitting. The computer may also have a built-in mouse, a miniature display 130 and a keyboard 135. Location is obtained via a USB GPS device 145.

In operation, a vehicle driver can install the device shown in FIG. 1 in their vehicle. The antennas 115, 125 receive Wi-Fi signals and alert the motorist to the proximity and identity of emergency vehicles within a specified distance. The alert system 140 can use lights, audio tones, and bar graphs showing signal strength to approximate the distance. In embodiments, the distance can detected e.g., within 1000 feet and up to a mile.

The display monitor 130 can show information about the alert, as determined from the processing done by the memory as described herein. The information can include, as described herein, the city, state, County SSID, manufacturer and number of vehicles detected for the emergency alert. An exemplary display showing this information is found in FIG. 2.

Figure 2:
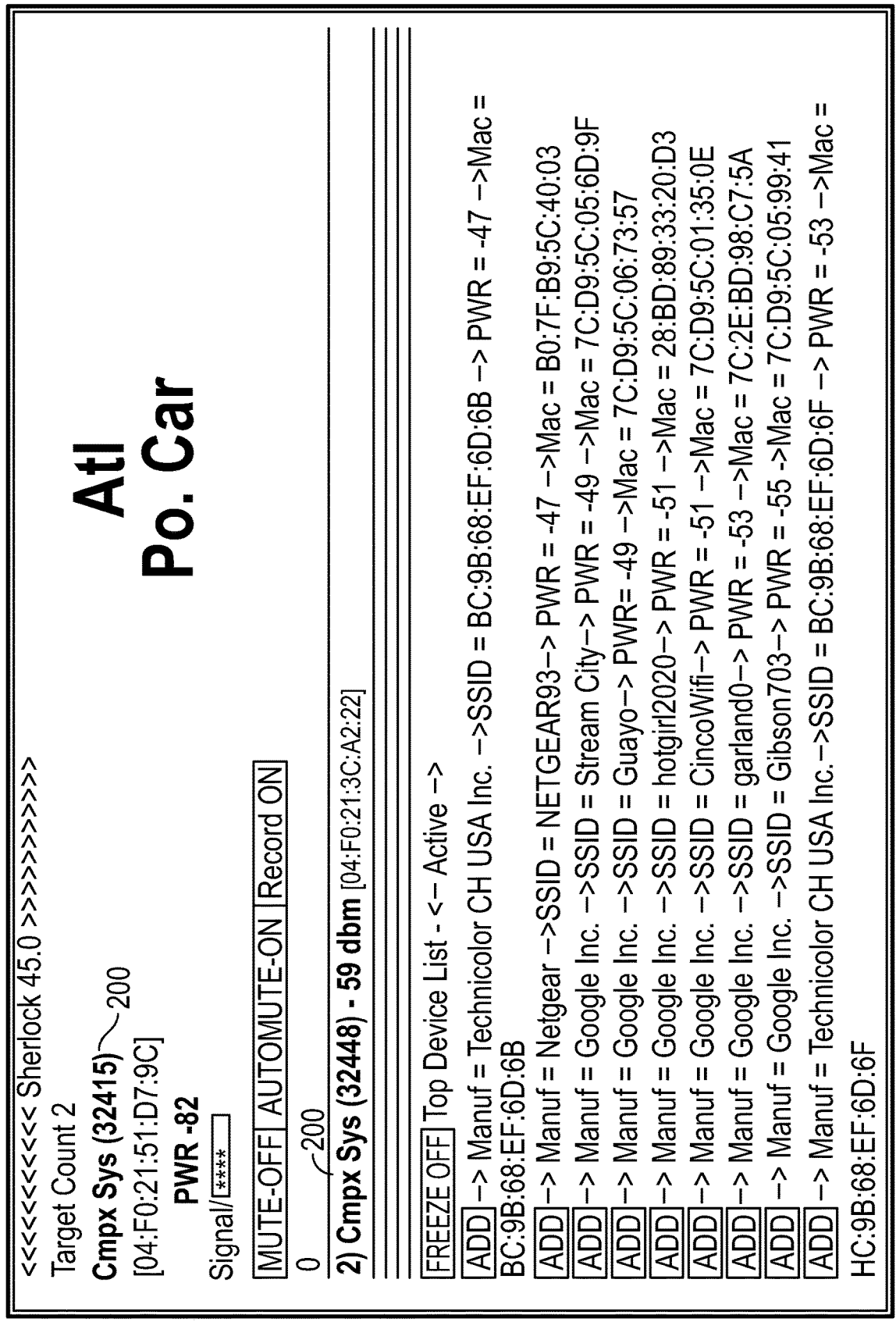
FIG. 2 shows an exemplary display.

Note FIG. 2 shows a number of different items of information, about the detected Wi-Fi signals. The display shows that 2 Compex devices have been detected, 200, 2 yes sir 02. It shows the complete MAC ID of each device, and the power. These are the likely emergency vehicle devices. Underneath, the system also shows other Wi-Fi signals that are received, none of which are likely to be associated with an emergency vehicle.

In operation, the device 99 is installed in the vehicle with the directional antenna 115 in the front window, and the omnidirectional antenna 125 directly behind it to receive signals from the rear. The computer 100 can be located anywhere in the vehicle, for example on the dashboard, with the display 130 showing, so that the user can read from the display.

Figure 3:
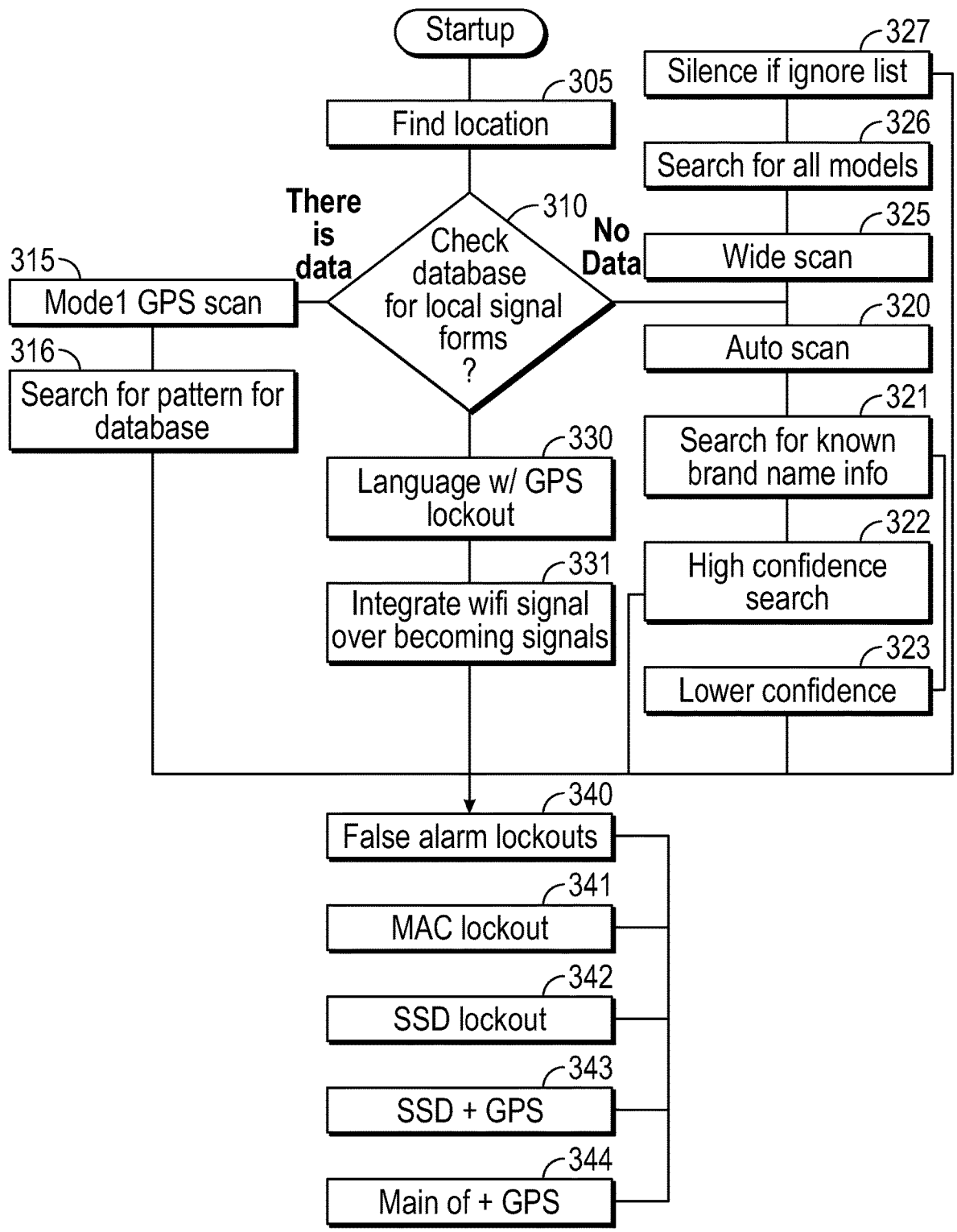
FIG. 3 shows a flowchart of operation.

The device 99 is powered on using power from the vehicle, and boots up to take GPS readings from the GPS device 145. The operation of the system is shown in the flowchart of FIG. 3. After initial operation, the driver receives alert tones, as well as a bar graph indicating signal strengths, an alert light and other alerts to indicate the identity, number, and range of any nearby emergency vehicle.

The computer stores a database in memory 101 indicating, for each of a plurality of different geographical locations, what signals should exist for that location. This database, for example, describes the forms of the signals that are used by emergency vehicles in the specific local area. The system also finds likely false signals and can block alerts when data matching one of those likely to be false signals is obtained, as described herein.

After startup, the system uses information from the GPS device 145 to find its location at 305. The display displays the message "GPS scan" and begins the GPS scanning mode. First the GPS latitude and longitude is determined by the GPS USB chip 145 inserted into the computer.

Based on this location, the computer checks the database 101 to determine if there is existing data for the current location. For each of a plurality of location, the database stores signal data that indicate the form that emergency signals take in that specific location.

A list of Counties/Cities and their lat/long pairs and radius is searched to determine if there is signal data stored for the current location. The List also contains pointers to the city/county Police/Emergency Vehicle's Manufacturer MAC code and SSID Patterns, MAC address patterns and known MAC identifiers of specific vehicle wifi' access points. The device performs differently based on whether there is existing data for that location or not.

If there is data, then the system operates in mode 1: GPS-SCAN at 315.

If there is no data the system operates in mode 2: AutoScan at 320 or 3: WideScan 325. These modes are user selectable or automatic. Both of the mode 2 and mode 3 systems analyze the signals and postulate, based on certain rules, whether the signals are likely to be emergency vehicle signals.

The following is an example of operation in Locations where vehicle wifi beacon data is known, e.g., where the emergency information for the City/County is on file. This begins GPS-Scan mode 315 to detect signals.

Detection Examples (Abbreviations: Hx is a letter 0-9 or a capital letter A-F)

In this example, the GPS has indicated the location as being Hollywood Fl.

Location: Hollywood, FL Agency Police Dept. This is just an example of a way that the detection can be carried out, since as of the writing of this document, Hollywood Florida no longer uses Wifi of this type.

This location is set in the database to have three Vehicle's wifi manufacturers and SSIDs:

Compex Sys (MAC 04:F0:21:),

3 SSIDs 114K-634B53, 114K-6348E7, 114K-6348EC

The Pattern we search for at 316 is: manufacturer is Compex Sys (MAC 04:F0:21:) AND SSID is of the format: 114K-634HxHxHx.

Another embodiment uses the technique of detecting the MAC ID of the manufacturer and the SSID format.

As an example, for the location Location: Moon Township, PA Agency Police Dept.

Manufacturer: Cradle Point (MAC 00:30:44:) Four of their Wifi SSIDs IBR1100-1B9, IBR1100-1AC, IBR600C-9A3, IBR1100-3DD Pattern searched for at 316 is manufacturer Cradle Point (MAC 00:30:44:) AND SSID is one of the formats: IBR1100-HxHxHx, IBR600-HxHxHx, IBR600C-HxHxHx Another embodiment uses the technique of detecting the: Manufacturer MAC and SSID format Location: Gwinnet County, GA Agency Police Dept.

Manufacturer: Compex Inc. MAC 00:80:48: Full MAC codes of four vehicles are 1) 00:80:48:70:07:80, 2) 00:80:48:70:07:F7, 3) 00:80:48:70:09:AF, 4) 00:80:48:70:0B:FB.

Pattern searched for at 316 is then Manufacturer Compex Inc. AND MAC codes 00:80:48:70:Hx:Hx.

Another Technique is Manufacturer and MAC code patterns

Location: Duluth, GA Agency Police Dept.

Manufacturer: Compex Sys mac 04:F0:21:, Three wifi specific MAC codes 04:F0:21:25:ED:2B, MAC 04:F0:21:22:76:6A,

MAC 04:F0:21:29:1B:6B

Pattern is searched for at 316 is the specific wifi MAC codes.

Another Technique is Specific wifi MAC codes

Location: Villa Rica, GA Agency Police Dept.

Manufacturer: Novatel Wireless Systems, two SSIDs Verizon8800L-027B, Verizon8800L-5134

Pattern at 316 is Manufacturer Novatel Wireless Systems and Specific SSIDs

If there is no data for the location, then the system displays and begins automatic scanning at 320, or as an alternative to the automatic scan, the user can select a wide-scan mode at 325 as described herein.

In auto scan mode, the device scans for known patterns and generalized patterns in the signal data. If a match is found, than the manufacturer name and SSID is displayed.

The Auto-Scan mode is intended for operation in Locations where vehicle wifi beacon data is unknown. This is optimized for most detections with the least number of False Alerts.

The following example uses the following abbreviations:

CP is Cradle Point—MAC 00:30:44:,

Compex Sys is Compex Systems Limited LTD—MAC 04:F0:21:,

Compex Inc is Compex Incorporated—MAC 00:80:48:,

NMS is Novatell Wireless Systems MAC 28:80:A2:,

Utility Inc is Utility Inc—MAC 00:09:BC:

Hx is a letter 0-9 or a capital letter A-F

N is a number between 0-9

For this example Note: SSID is shown in parentheses, if empty means the SSID is an empty space " "

But if with MAC indicated by (MAC) indicates the MAC address appears in the SSID.

This is the case when no SSID is specified in the Wifi Beacon configuration.

At 321, the device searches for known brand name information. In this embodiment, the search is for the above manufacturers with the below SSID patterns based on manufacturer:

322 finds search results that are for a high confidence search result. This results from a Pattern Manufacture (SSID)—high confidence of one of the following brand name and search combination.

Pattern Compex Sys(114K-634HxHxHx)

Pattern CP(IBR1700-BHxHx)

Pattern CP(IBR1100-HxHxHx) or CP(IBR600-HxHxHx) or CP(IBR600C-HxHxHx)

Pattern CP(IBR1100-HxHxHx) or CP(IBR600-HxHxHx) or CP(IBR600C-HxHxHx)

pattern Cmpx Sys(Qx-Nx) where Qx is the first two digit number and is between 13 and 19 Inclusive and Nx is a number between 10-40 inclusive and they are separated by a dash symbol).

Pattern CP with SSID IBR900-HxHxHx

Pattern Compex Sys(5 digit number with 3 is first digit and second digit is between 1 and 5 inclusive)

CP(4 digit number)

pattern Compex Sys("INMOTION" in the SSID)

pattern CP(IBR1700HxHxHx)

these patterns are specific to known manufacturers and SSIDs and hence provide a high confidence that the results will be real results.

At 323, more general patterns are detected which provide a lower confidence level. These patterns may represent real alerts, but may also be other nonrelated things.

pattern CP(IBRNNNN-HxHxHx)

pattern NMS(Verizon-MiFi8800L-HxHxHxHx)

pattern NMS(Verizon-MiFi7730L-HxHxHxHx)

pattern CPO, pattern Compex Sys(5-10 numeric digits and/or one dash)

pattern Compex Sys( )

pattern Compex Inc( )

pattern Compex Inc(MAC), pattern Compex Sys(MAC), pattern Utility Inc( )

The wide scan mode at 325 is similar to the auto-scan mode, but accepts a much wider number of manufacturers and all SSIDs are displayed except for an exclusion list of known false alerts.

The wide scan mode is intended for Operation in Locations where vehicle wifi beacon data is unknown: The Wide-Scan mode is Optimized for Detection of all Police and Emergency Vehicle Wifi with False Alert reduction.

The received wifi beacons are searched for all known models of Police/Emergency Wifi Manufacturers at 326:

["Verizon-791", "Verizon",NOVATEL, "Compex Systems Pte Ltd", "Utility Inc", "PePWave Ltd", "PePWave Limited", "CradlePoint Inc.", "Compex Incorporated", "Motorola Solutions", "Sierra Wireless", "Verizon-MiFi791", "Martel", "PRO-VISION Inc.", "WAAV"]

And the detections of these manufacturers are screened out when any part of an ignore list is matched at 327. In the embodiment, the ignore list can include SSID character strings containing any of the following:

Ignore SSIDs containing these character strings from any manufacturer:

"hvac"."photo", "bmrp", "site", "bus", "net", "speed", "delta", "pkwy",

"rehab". "wireless", "wifi", "admin", "comfort", "truck", "broad", "fire", "cradle", "spot", "gp_rswl", "job", "toy", "station", "guest", "power", "feed", "cararb", "pizza", "metro2", "pl_gc", "crowder", "demo", "staff", "bridge"

Ignore SSIDs containing these strings from manufacturer Novatell Wireless Solutions:

"verizon-mifi6620", "verizon-mifi4510", "verizon-mifi4620", "verizon-m2100", "verizon-m1000"

To reject Fire, EMS, Ambulances check SSIDs for these character strings

//Fire, EMS, Ambulance reject

"fd-", "ems", "amb", "gmreper", "amreper"

An additional mode described herein uses a long-range mode with GPS lockout at 330. This mode carries out an extra long range detection by integrating the raw Wi-Fi signal on a channel for one second. This is done to capture the energy of the 20 beacon signals/second that the police wifi transmit. This operation is performed digitally upon the digitized signal data.

This provides a detection gain of approximately the square root of 20 which is a gain of 4.5 or 6.4 db, and has the effect to approximately double the detection range.

In an embodiment, this long range type of detection is displayed in a different color and signal tone.

False signals can be locked out manually by storing the false signal's GPS coordinates when no police car is present. This is done as described herein.

Displayed Data can include the number of Police/Emergency vehicles (Bogey Count), detected, type, and signal strength displayed as a bargraph with alert beep rate proportional to signal strength. The operator's vehicle speed is displayed from GPS data, an Extra Unique tone occurs when the number of Bogeys increases.

Using front and rear antennas, the device compares the detection levels in each antenna to determine WIFI direction and displays Arrows Up and Down to indicate which Antenna has the greatest received power.

The inventor understands that there are a number of different Wi-Fi sources, and consequently, it is contemplated that many of these Wi-Fi sources may cause alerts, even if they are not from an emergency vehicle and even if they are not identified by the scanning. An embodiment describes a system which allows manual creation of lockouts for certain alerts, to reduce the number of false alarms as 340.

In an embodiment, there are four types of Lockouts:

A. MAC Lockout at 341—only locks out a specific device of an identified false alarm, as discussed herein.

B. SSID Lockout at 342 locks out all similar SSID's for the manufacturer once a false alarm has been identified. An embodiment uses this when there is a false alert with a noticeable pattern in the manufacturer's SSID. One example of this is when a cradle point device is found with an SSID of "0000" that appears in Norther Virginia. The operator types in the SSID "0000" and selects the Manufacturer "Cradle Point" and presses a lockout button. Now any Cradle Point manufacturer whose SSID contains the character string "0000" will be ignored.

C. SSID Lockout with GPS as 343 is like the SSID lockout above but only locks out that Manufacturer and SSID string in that area. This embodiment may allow the Radius/City/County to be selectable. This option is used to lockout Manufacturer's with certain SSIDs or SSID string fragments codes that keep appearing falsely ONLY in your area.

D. MANUFACTURER+GPS Lockouts at 344 locks out that Manufacturer in that area—The Radius/City/County is selectable.

Use this option to lockout Manufacturer codes that keep generating false alerts in your area. The device stores and displays the location of each alert and the number of times this alerts has come from the same location. Once the alert is seen three times in the same location it will automatically lock it out.

In one embodiment, there is a false alarm button 141 that can be pressed by the user to ignore, or lock out, certain alerts that appear to be false alerts.

When this false alarm button is initiated, this may signal a Mac lockout 341.

For example: If an alert appears to be in the same place each time such as near a Marta Train, that alert can be locked-out in the future so the alert caused by the wifi at that location does not cause alarms in the future. By pressing the button 140, the full 6 digit MAC address is stored as a false alarm. When that same MAC address is seen again, it is automatically ignored, so that if it is seen again it is ignored. This locks out one specific device because each Wifi Access Point has a unique 6 number MAC address. An Example MAC address for a Wifi Beacon Access Point is: 00:80:48:4E:59:86. The first three numbers of the MAC address uniquely identify the Manufacturer. If the SSID is not set up, the MAC address will be repeated in the SSID.

The device stores the MAC address and location of each device that causes an alert. The location of each device alert and the number of times this alert has come from the same device at the same location, is displayed to assist in determining false alerts.

The user can also select which of the lockouts are used, which are automatically determined, and which are selected when the button is pressed.

GPS Lockout with Learn/Re-Learn—The device can also perform automatic lock out of false alerts by recording each alert's GPS location and MAC code (which is unique for each Wifi Beacon) and looking for Beacons that appear in the same location with approximately the same signal strength multiple times.

In one embodiment, the system can learn and store the locations of the false signals automatically by storing signals from the last times at the same GPS location and comparing the pattern of signals at the same frequency was that were measured. Specifically, a 10×10 GPS signal map is stored and compared by signal subtraction and calculation of the Root Mean Square difference less that a variable threshold.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An emergency vehicle detection system, comprising:
   a computer, having a database storing plural different signal data, the plural different signal data representing signals used by emergency services in each of a plurality of different local areas;
   a location detecting device, detecting a current local area; and
   a wireless network receiver, receiving Wi-Fi signals;
   the computer detects the local area to analyze the Wi-Fi signals received by the wireless network receiver,
   the computer using the database, to determine that the Wi-Fi signals received by the wireless network receiver match to the plural different signal data used by emergency services in the local area stored in the database, and
   the computer signaling the presence of an emergency vehicle responsive to determining that the Wi-Fi signals are detected to use the signal data used by emergency services in the local area,
   wherein the computer operating to store signal data indicative of likely false alarms in the database, and the computer operating to detect a false alarm by comparing against the signal data indicative of likely false alarms in the database, and the computer operating to not signal the emergency vehicle responsive to the false alarm being detected, and
   wherein the system detects false alarms, and the computer analyzes the data for patterns in the manufacturer and/or SSID of the false alarms and automatically locks out future signals which include said patterns.

2. The system as in claim 1, further comprising a user interface including a display, a keyboard, and a sound producing device, the display operating to display information about wireless sources that have been received.

3. The system as in claim 1, wherein the wireless network receiver includes first and second wireless network receivers, the first wireless network receiver preferentially receiving signals from a first direction and the second wireless receiver preferentially receiving signals from a second direction different than the first direction.

4. An emergency vehicle detection system, comprising:
   a computer, having a database storing plural different signal data, the plural different signal data representing signals used by emergency services in each of a plurality of different local areas;
   a location detecting device, detecting a current local area; and
   a wireless network receiver, receiving Wi-Fi signals;
   the computer operates based on detecting the local area to analyze the Wi-Fi signals received by the wireless network receiver using the database, to determine that the Wi-Fi signals match to the signal data used by emergency services in the local area, and signaling the presence of an emergency vehicle responsive to determining that the Wi-Fi signals are detected to use signal data used by emergency services in the local area,
   the wireless network receiver includes first and second wireless network receivers, the first wireless network receiver preferentially receiving signals from a first direction and the second wireless receiver preferentially receiving signals from a second direction different than the first direction, and
   further comprising a user interface including a display, and wherein the display displays information indicative of a location from which the signals are being received.

5. The system as in claim 1, wherein the signaling comprises providing display tones and audible tones indicating identity, number and range of detected emergency vehicles.

6. The system as in claim 1, wherein the computer further operates to find likely false signals in the area and to block said false signals from the area.

7. An emergency vehicle detection system, comprising:
a computer, having a database storing plural different signal data, the plural different signal data representing signals used by emergency services in each of a plurality of different local areas;
a location detecting device, detecting a current local area; and
a wireless network receiver, receiving Wi-Fi signals;
the computer operates based on detecting the local area to analyze the Wi-Fi signals received by the wireless network receiver using the database, to determine that the Wi-Fi signals match to the signal data used by emergency services in the local area, and signaling the presence of an emergency vehicle responsive to determining that the Wi-Fi signals are detected to use signal data used by emergency services in the local area, wherein the computer determines if the database includes signal data for a current location detected by the location detecting device,
and responsive to the computer detecting signal data for the current location, the computer operates in a first mode to detect said wi-fi signals and compare content of the wifi signals against the signal data,
and responsive to the computer detecting no signal data for the current location, then operates in a second mode to detect signals and use data from the database indicating those signals represent emergency devices.

8. The system as in claim 7, wherein in the first mode, the system detects patterns of Wi-Fi manufacturers, Mac IDs and/or SSIDs.

9. The system as in claim 7, wherein in the second mode, the system searches for SSIDs that have a high confidence level of being a brand used by an emergency vehicle.

10. The system as in claim 1, wherein the computer carries out long-range detection by integrating Wi-Fi signals on a channel over a time period to capture energy of multiple different beacon signals over the time period.

11. The system as in claim 1, further comprising a manual actuation device which is actuated to indicate a false alarm, and where the computer stores a MAC ID of a specific device being stored during the false alarm, and prevents future alarms based on the specific device.

12. An emergency vehicle detection system, comprising:
a computer, having a database storing plural different signal data, the plural different signal data representing signals used by emergency services in each of a plurality of different local areas;
a location detecting device, detecting a current local area; and
a wireless network receiver, receiving Wi-Fi signals;
the computer operates based on detecting the local area to analyze the Wi-Fi signals received by the wireless network receiver using the database, to determine that the Wi-Fi signals match to the signal data used by emergency services in the local area, and signaling the presence of an emergency vehicle responsive to determining that the Wi-Fi signals are detected to use signal data used by emergency services in the local area,
wherein the computer operating to store signal data indicative of likely false alarms in the database, and the computer operating to detect a false alarm by comparing against the signal data indicative of likely false alarms in the database, and the computer operating to not signal the emergency vehicle responsive to the false alarm being detected,
wherein the system detects false alarms, in an area, and locks out signals which have similar patterns to the false alarms, only in the area.

13. The system as in claim 12, wherein the system detects false alarms by a manufacturer in the area, and locks out alarms from the manufacturers in the area.

14. An emergency vehicle detection system, comprising:
a computer, having a database storing plural different signal data, the plural different signal data representing signals used by emergency services in each of a plurality of different local areas;
a location detecting device, detecting a current local area; and
a wireless network receiver, receiving Wi-Fi signals;
the computer operates based on detecting the local area to analyze the Wi-Fi signals received by the wireless network receiver using the database, to determine that the Wi-Fi signals match to the signal data used by emergency services in the local area, and signaling the presence of an emergency vehicle responsive to determining that the Wi-Fi signals are detected to use signal data used by emergency services in the local area,
wherein the computer operating to store signal data indicative of likely false alarms in the database, and the computer operating to detect a false alarm by comparing against the signal data indicative of likely false alarms in the database, and the computer operating to not signal the emergency vehicle responsive to the false alarm being detected,
wherein the system determines said false alarms by detecting the same signal in the same area multiple times.

15. An emergency vehicle detection system with false alarm detection, comprising:
a computer, having a database storing plural different signal data the plural different signal data representing signals used by emergency services and storing false alarm information;
a wireless network receiver, receiving Wi-Fi signals;
wherein the computer operates based on analyzing the Wi-Fi signals received by the wireless network receiver,
to determine that the Wi-Fi signals match to the signal data used by emergency services,
and detecting the wi-fi signals being part of a wifi lockout mode,
the Wifi lockout modes including all of:
a MAC Lockout that only locks out a specific device by MAC address,
an SSID Lockout that locks out all SSID's for a manufacturer that contain a certain string of characters;
a manufacturer+GPS lockout that locks out that Manufacturer in an area; and
an auto GPS Lockout that locks out the same alert having come from the same location multiple times.

16. The system as in claim 15, further comprising a location detecting device, detecting a current local area; and where the database has entries for each of a plurality of locations.

* * * * *